(12) United States Patent
Gaertner et al.

(10) Patent No.: US 9,631,617 B2
(45) Date of Patent: Apr. 25, 2017

(54) PISTON PUMP HAVING A HOLDER

(75) Inventors: Oliver Gaertner, Abstatt (DE); Heiko Jahn, Tamm (DE); Marc Zimmermann, Sonthofen (DE); Daniel Gosse, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 346 days.

(21) Appl. No.: 13/994,753

(22) PCT Filed: Oct. 25, 2011

(86) PCT No.: PCT/EP2011/068639
§ 371 (c)(1),
(2), (4) Date: Oct. 28, 2013

(87) PCT Pub. No.: WO2012/079815
PCT Pub. Date: Jun. 21, 2012

(65) Prior Publication Data
US 2014/0301876 A1    Oct. 9, 2014

(30) Foreign Application Priority Data

Dec. 17, 2010    (DE) .................... 10 2010 063 322

(51) Int. Cl.
| F04B 49/22 | (2006.01) |
| F04B 53/00 | (2006.01) |
| B60T 8/40 | (2006.01) |
| F04B 1/04 | (2006.01) |
| F04B 11/00 | (2006.01) |
| F04B 39/12 | (2006.01) |
| F04B 53/16 | (2006.01) |

(52) U.S. Cl.
CPC ............ *F04B 49/22* (2013.01); *B60T 8/4031* (2013.01); *B60T 8/4068* (2013.01);
(Continued)

(58) Field of Classification Search
CPC .. F04B 39/10; F04B 39/1013; F04B 39/1066; F04B 11/0091
(Continued)

(56) References Cited

U.S. PATENT DOCUMENTS

| 5,094,599 A | 3/1992 | Budecker |
| 5,213,482 A | 5/1993 | Reinartz et al. |

(Continued)

FOREIGN PATENT DOCUMENTS

| DE | 103 14 979 B3 | 12/2004 |
| FR | 2 279 949 A1 | 2/1976 |

(Continued)

OTHER PUBLICATIONS

English Translation of the Specification of FR 2279949 (Langden) obtained on Dec. 9, 2015.*
(Continued)

*Primary Examiner* — Dominick L Plakkoottam
*Assistant Examiner* — Connor Tremarche
(74) *Attorney, Agent, or Firm* — Maginot, Moore & Beck LLP

(57) ABSTRACT

A piston pump, in particular for a hydraulic assembly of an electronically controllable vehicle brake system, includes a cylinder element that has a pressure chamber with an outlet formed on the inside. The piston pump further includes an outlet-restricting element held on the outside of the cylinder element on a component by a first holder.

15 Claims, 5 Drawing Sheets

(52) U.S. Cl.
CPC ........ *F04B 1/0421* (2013.01); *F04B 11/0091* (2013.01); *F04B 39/125* (2013.01); *F04B 53/001* (2013.01); *F04B 53/007* (2013.01); *F04B 53/162* (2013.01)

(58) Field of Classification Search
USPC ....... 417/437, 540, 545, 546, 552–554, 559, 417/569
See application file for complete search history.

(56) References Cited

U.S. PATENT DOCUMENTS

| | | | | |
|---|---|---|---|---|
| 6,866,489 B2* | 3/2005 | Volz | ...................... | B60T 8/4031 137/454.4 |
| 7,004,733 B2* | 2/2006 | Schepp | ................ | B60T 8/4031 417/470 |
| 7,278,835 B2* | 10/2007 | Schmitt | ................. | B60T 8/4031 138/26 |
| 2003/0047993 A1* | 3/2003 | Furuya et al. | ............. | 303/116.4 |
| 2004/0166004 A1 | 8/2004 | Schmitt et al. | | |
| 2008/0317618 A1 | 12/2008 | Kim | | |

FOREIGN PATENT DOCUMENTS

| | | | | |
|---|---|---|---|---|
| FR | 2279949 A1 * | 2/1976 | ................ | F04B 1/02 |
| JP | 2001-225742 A | 8/2001 | | |

OTHER PUBLICATIONS

International Search Report corresponding to PCT Application No. PCT/EP2011/068639, mailed Feb. 1,2012 (German and English language document) (7 pages).

* cited by examiner

US 9,631,617 B2

PISTON PUMP HAVING A HOLDER

This application is a 35 U.S.C. §371 National Stage Application of PCT/EP2011/068639, filed on Oct. 25, 2011, which claims the benefit of priority to Serial No. DE 10 2010 063 322.4, filed on Dec. 17, 2010 in Germany, the disclosures of which are incorporated herein by reference in their entirety.

BACKGROUND

The disclosure relates to a piston pump, which is intended, in particular, for a vehicle hydraulic brake system, having a cylinder element, inside which a delivery chamber with an outlet is formed.

Known piston pumps comprise a cylinder element, in which a delivery chamber is formed. A piston is guided so that it is axially displaceable in the delivery chamber. The piston can be driven to perform a reciprocating stroke movement in an axial direction, which causes fluid to be delivered in a manner known in the art. In order to prevent noise-generating pressure pulses, a damping chamber and a restrictor, which are both arranged outside the cylinder element and often even separately from the piston pump, are usually hydraulically connected to the outlet side of such piston pumps.

Such a piston pump is disclosed in DE 103 14 979 B3. In order to prevent noise-generating pressure pulses in the connected hydraulic system, the known piston pump comprises a restrictor, connected downstream of the fluid outlet for damping purposes. Here the restrictor comprises a primary hydraulic filter. The fluid outlet is guided along at least a portion of the circumferential surface of a liner and in the area of this portion the filter and the restrictor are formed in one piece on the circumferential surface of the liner.

SUMMARY

According to the disclosure a piston pump is created, in particular for a hydraulic assembly of an electronically controlled vehicle brake system, having a cylinder element, inside which a delivery chamber with an outlet is formed. On the cylinder element an outlet-restricting element is mounted on a component by means of a first mount. In other words a component having a first mount for an outlet-restricting element is arranged on the cylinder element according to the disclosure. This outlet-restricting element may more preferably be a restrictor.

In an advantageous development of the disclosure the restrictor is embodied as a restrictor plate. The first mount, in which the restrictor plate is then accommodated, may have a bearing surface for this purpose. The restrictor plate can thereby be subjected to defined pre-tensioning. The restrictor plate may also be integrated into this first mount according to the disclosure. Such a first mount is capable of achieving a very precise opening pressure of the restrictor.

The restrictor itself is connected to the hydraulic outlet side of an outlet valve of the piston pump, that is to say downstream of the outlet valve of the piston pump in the direction of flow. The restrictor may be arranged in a pump bore or in an outlet duct in the pump housing, and according to the disclosure is held in the first mount. The restrictor serves for damping pressure pulses of the fluid delivered by the piston pump, which the piston pump induces due to its pulsating mode of delivery.

In addition a second mount for a spring is also preferably arranged or integrated in the component having the first mount for the outlet-restricting element. In an advantageous development this spring is the outlet valve spring for an outlet valve closing member. The spring rests on the second mount in the component. For this purpose the second mount may comprise a bearing surface. Here the components of the outlet valve of the piston pump, comprising the outlet valve closing member and the spring, are supported by the second mount.

In an alternative development the spring is integrated into the second mount. In this case the spring may be caulked into the second mount. The form of the mount varies according to the design of the spring. If the spring is a coil spring, the mount comprises a cup-shaped seat for the coil spring. If the spring is a leaf spring or spiral spring, the seat is of shallow design.

In addition a third mount for a hydraulic damper is preferably arranged or integrated into the component.

In this case the fluid delivered preferably first flows through an opening of the outlet valve into a damping chamber. The outflow then ensues via further, defined openings on the component according to the disclosure onto said restrictor plate. These openings may be designed with various shapes, in particular circular or slit-shaped. The restrictor plate sags due to the incident flow and the pressure differential, and the fluid can flow out via the further, defined openings. Here, at the same time, the damping volume is sealed off from the outlet, therefore giving a forced flow through the restrictor.

The damper forms a hydraulic capacity, which likewise has a forced flow passing through it and thereby exhibits an optimized response, because the restrictor forms a hydraulic resistance for the fluid on the outlet side.

An installation space for a hydraulic accumulator is also preferably provided in the component according to the disclosure. The accumulator may form a part of said hydraulic capacity.

Spacers in the form of thin feet to compensate for tolerances of the installation space of the component and to form the outlet bore may optionally be arranged downstream of the restrictor.

The component together with at least the one mount is preferably formed as an injection molded part or as a turned metal part or as a cold-formed part.

The design of the piston pump according to the disclosure having the component with the first mount for the outlet-restricting element; and the further advantageous mounts, which are arranged in this component or integrated into this component, affords the advantage that multiple functions are accommodated in just one component. Tolerances between the functions can be minimized through a correspondingly precise forming of this one single component.

The component serves, in particular, for the hydraulic connection between the outlet valve, which constitutes the separation from the delivery chamber, and an outlet bore. Here this hydraulic connection between the outlet valve and the outlet bore may, at no significant additional cost, at the same time have a compressible volume.

The piston pump according to the disclosure in particular comprises a pump cylinder, which is accommodated in a hydraulic unit. The pump cylinder forms a cylinder element within the meaning of the disclosure and as delivery chamber comprises a cylindrical recess, in which a piston is guided so that it is axial displaceable.

The piston pump according to the disclosure is intended, in particular, as a pump in a brake system of a vehicle and is used for controlling the pressure in wheel brake cylinders. Such brake systems are commonly known to include wheel slip control (ABS or ASR), a traction control system (TCS), a brake system serving as a steering aid (FDR), an electro-hydraulic brake system (EHB) and/or an electronic stability program (ESP). In such brake systems the pump serves for returning brake fluid from wheel brake cylinders into a brake master cylinder and/or for delivering brake fluid from a reservoir into wheel brake cylinders.

BRIEF DESCRIPTION OF THE DRAWINGS

Exemplary embodiments of the solution according to the disclosure are explained in more detail below with reference to the schematic drawings attached, of which.

DETAILED DESCRIPTION

Figure 1:
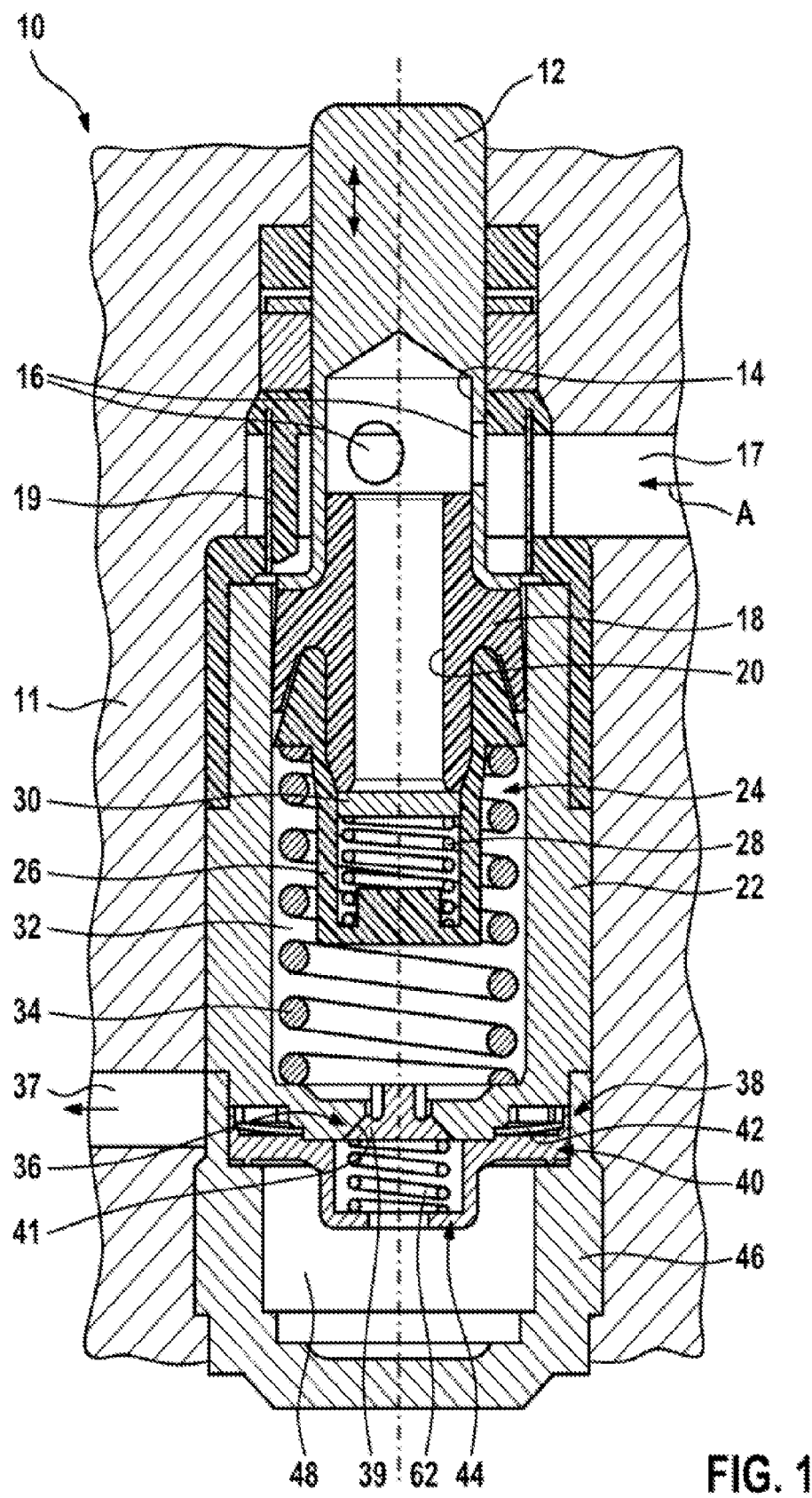
FIG. 1 shows a longitudinal section of a piston pump with a first exemplary embodiment of a component according to the disclosure having a seat for a coil spring.

The piston pump 10 is represented in FIG. 1. The piston pump 10 comprises a piston 12, which is capable of a reciprocating movement its in axial direction. This is done by means of an eccentric drive (not shown). The piston 12 comprises an axial bore 14 and multiple radial bores 16. A guide element 18, which has a passage opening 20 and which guides the piston 12 in a cylinder element 22, is arranged on the piston 12. The cylinder element 22 is formed with a substantially tubular shape in a pump housing 11. An inlet valve 24 is arranged at the end of the guide element 18 remote from the piston 12. The inlet valve 24 comprises a cage 26, a return spring 28 and a closing member in the form of a plate 30. The cage 26 is fixed to the guide element 16. The plate 30 closes and opens the passage opening 20 in the guide element 18. The inlet valve 24 is thereby arranged inside the cylinder element 22 in a delivery chamber 32, in which furthermore a piston return spring 34 is also arranged.

In addition, the piston pump 10 comprises an outlet valve 36, which is arranged on the end face of the cylinder element 22 remote from the piston 12. The outlet valve 36 comprises a valve member 39, which is pressed against a valve seat 41 formed in this end face by a valve spring 62 in the form of a spiral spring.

A component 38 bearing on the cylinder element 22 and having a first mount 40 in the form of a perforated annular disk for at least one outlet-restricting element 42 is arranged on the side of the end face remote from the delivery chamber 32. The outlet-restricting element 42 is designed as a restrictor plate.

In addition, a second mount 44 for supporting the valve spring 62 of the outlet valve 36 is formed or integrated on the component 38. The second mount 44 comprises an annular support or bearing surface for the valve spring 62. The valve spring 62 may optionally also be caulked into the second mount 44. The mount 44 can easily be adapted to the shape of the valve spring 62 to be used. For the valve spring 62, here designed as a coil spring, the mount 44 is of cup-shaped design.

An additional or further space 48 for the installation of a hydraulic accumulator (not illustrated further) is provided axially behind the component 38 in a cap-shaped closure element 46 adjoining the cylinder element 22.

The component 38 is formed as an injection-molded part, a turned metal part or a cold-formed part.

Figure 2:
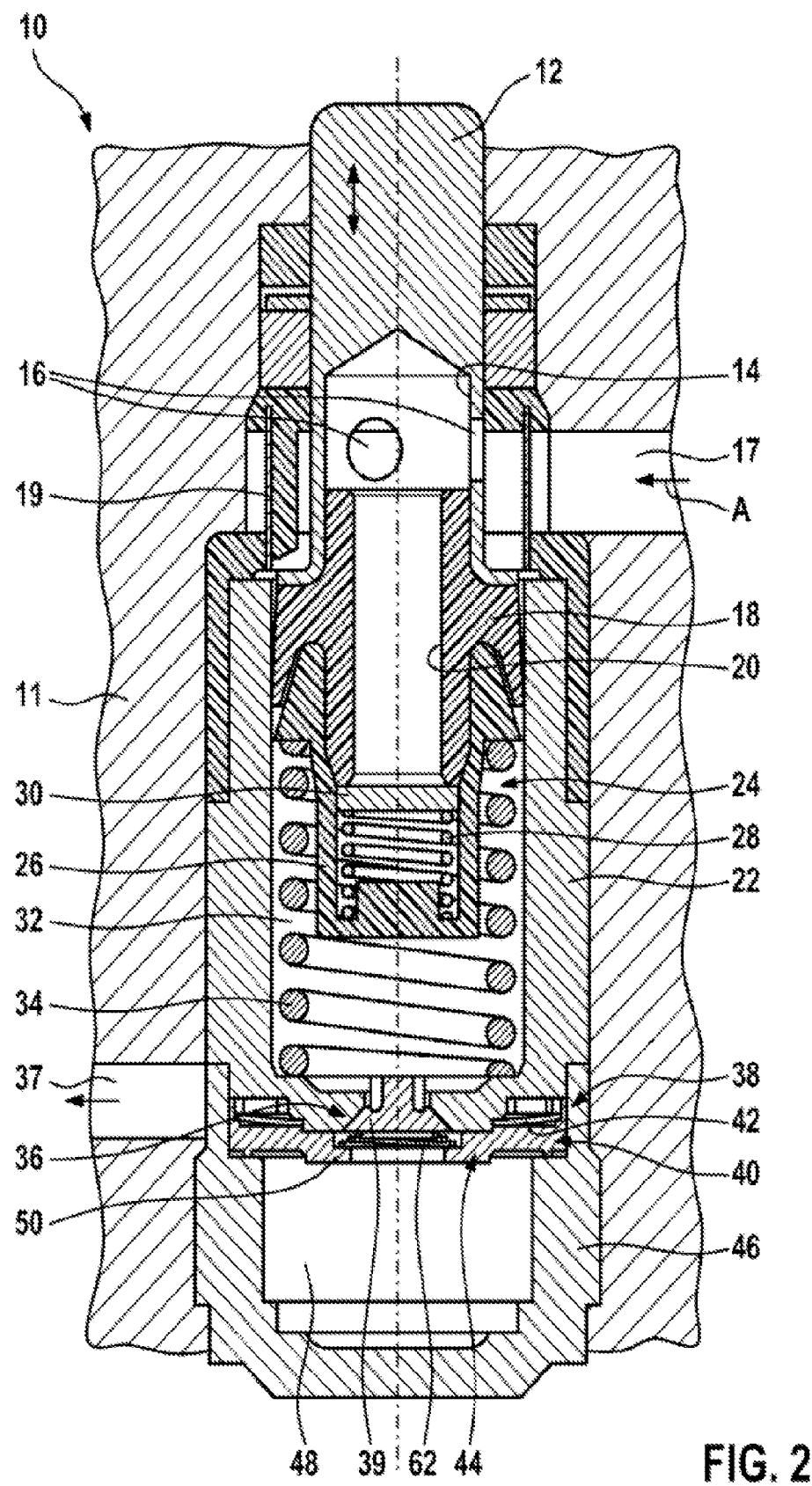
FIG. 2 shows a longitudinal section of a piston pump with a second exemplary embodiment of a component according to the disclosure having a seat for a spiral spring.

FIG. 2 represents another variant of the piston pump 10 according to FIG. 1.

In this variant the second mount 44 is designed as a comparatively shallow, substantially disk-shaped seat for a valve spring 62 embodied as a leaf spring or spiral spring.

Figure 3:
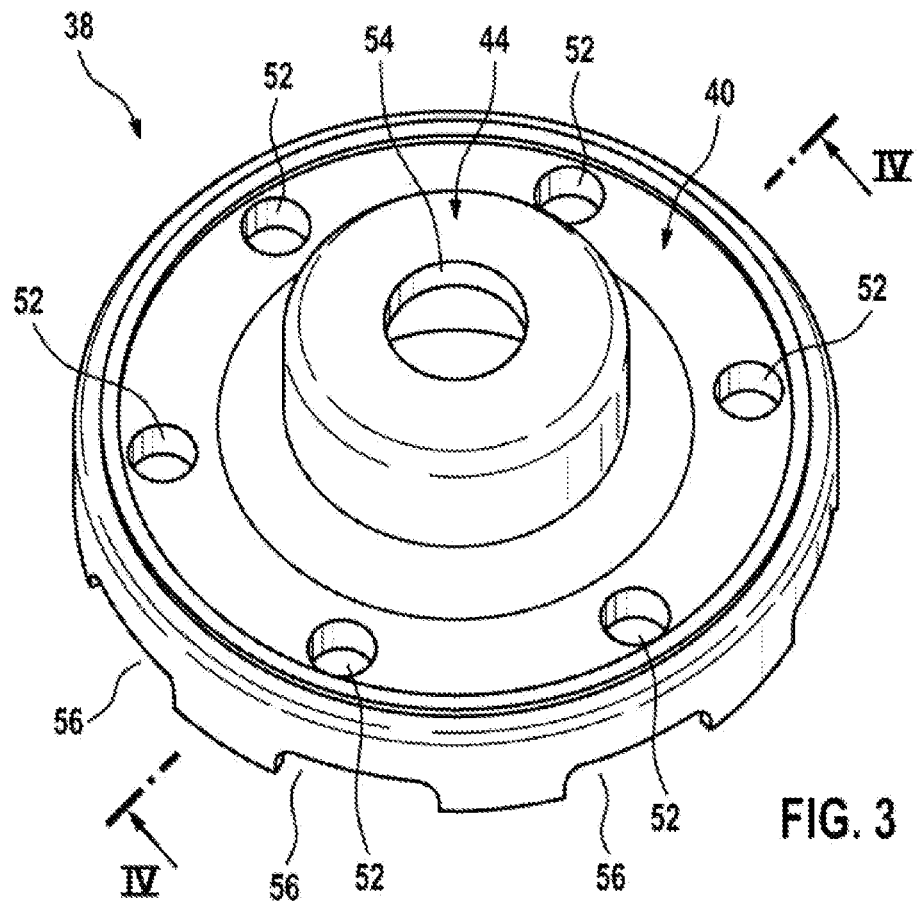
FIG. 3 shows an oblique top view of the component according to FIG. 1.
Figure 4:
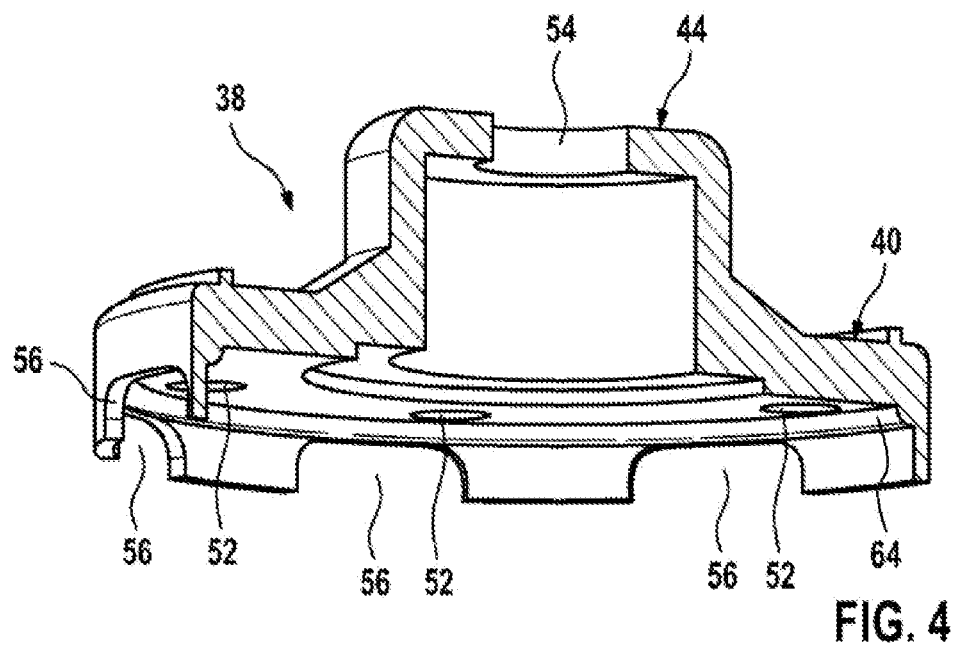
FIG. 4 shows the section IV-IV in FIG. 3.
Figure 5:
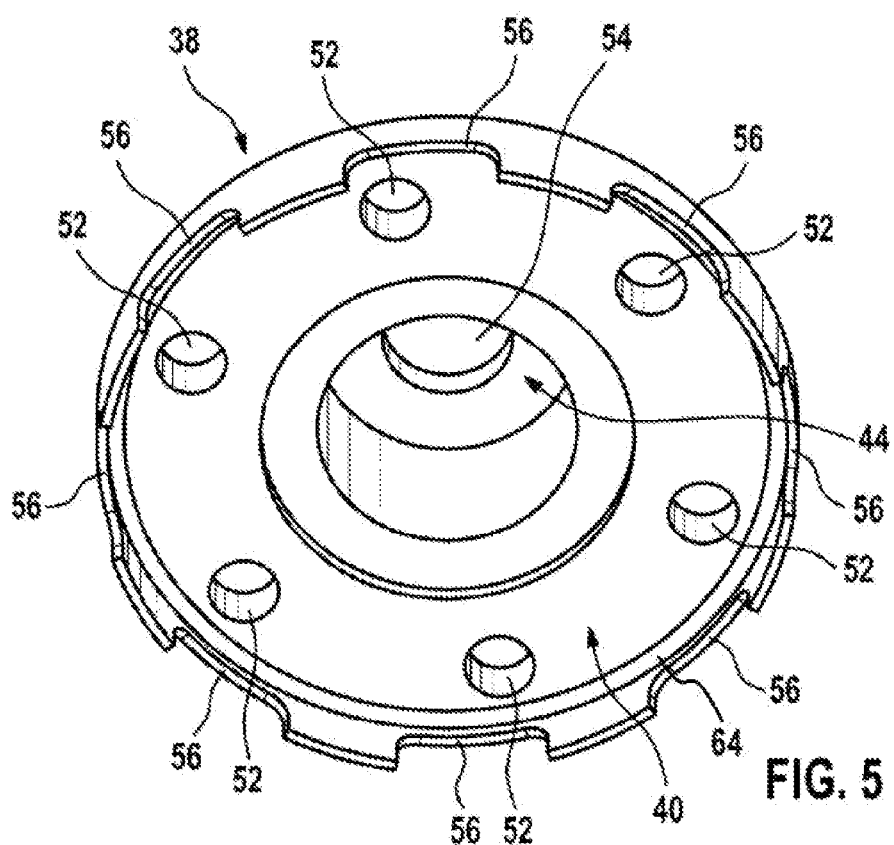
FIG. 5 shows and oblique view of the component according to FIG. 1 from below.

FIGS. 3 to 5 show the component 38 with its mount 40 in the form of a cup-shaped seat and its mount 44 in the shape of an annular disk angled at the outer edge.

A central opening 54 allowing the fluid coming from the valve body 39 to pass through to the rear side of the component 38 is provided on the cupped base of the mount 40. Openings 52, through which the fluid can flow back out from the rear side of the component 38 to the front side thereof, are arranged spaced at regular intervals in a circle on the annular disk of the mount 44. Here the fluid must cause the outlet-restricting element in the form of a restrictor plate, situated in front of these openings, to pivot, so as to allow it to escape on the front side through the openings 52. Six such openings 52 are provided here.

Outflow openings 56 in the form of depressions or recesses of the edge and likewise spaced at regular intervals are formed at the angled edge of the annular disk of the mount 44. Through these outflow openings 56, fluid can be discharged downstream of the outlet-restricting element 42 in the direction of flow into a substantially radial outlet opening 37, which is formed in the pump housing 11.

Figure 6:
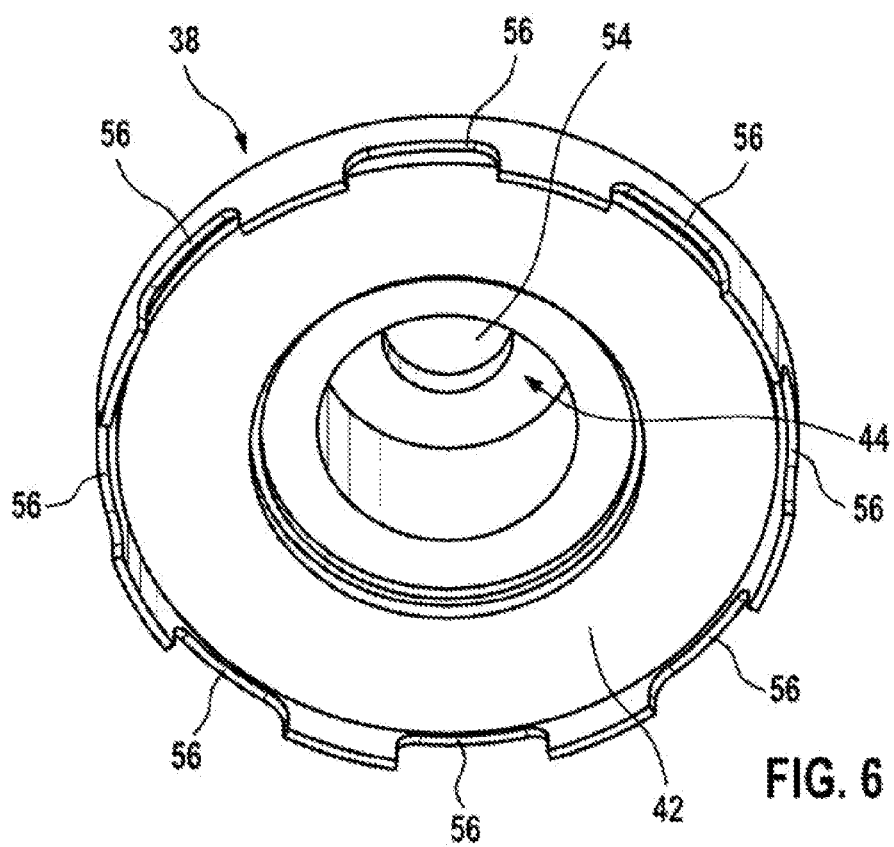
FIG. 6 shows a view according to FIG. 5 with outlet-restricting element.

FIG. 6 represents the outlet-restricting element 42 in the form of a deflectable restrictor plate, enclosed 15 by the mount 44 on the component 38, added to the component 38.

Figure 7:
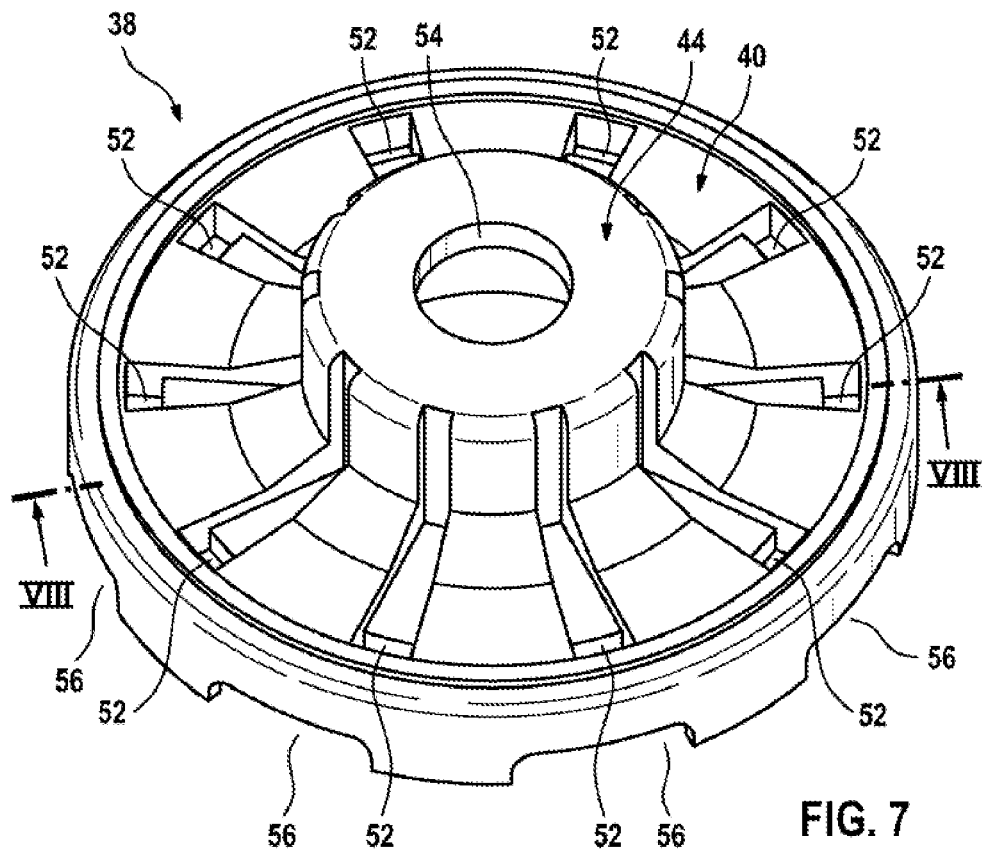
FIG. 7 shows an oblique top view of a variant of the component according to FIG. 1
Figure 8:
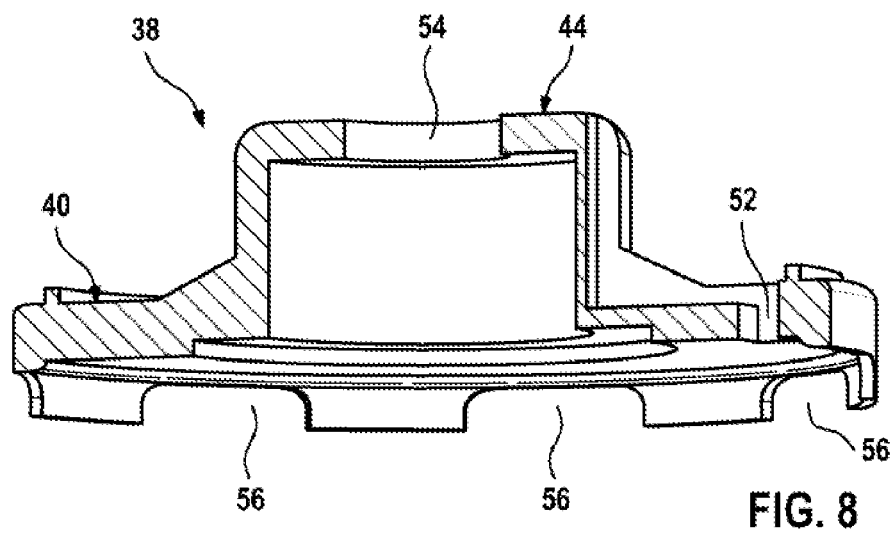
FIG. 8 shows the section VIII-VIII in FIG. 7.

FIGS. 7 and 8 show a variant of the component 38, in which the openings 52 are designed as radially oriented slits. Here the slits as depressions also extend through the cup-shaped shoulder for the mount 40 and through the annular plate for the mount 44.

Such a piston pump 10 functions as follows:

In a suction phase of the piston pump 10 the outlet valve 36 is closed and the inlet valve 24 is opened. Fluid is thereby carried through the fluid feed line 17, towards and through a filter element 19, the radial bores 16, the axial bore 14 and the longitudinal bore 20 of the guide element 18 to the inlet valve 24. The fluid is drawn into the delivery chamber 32 through the opened inlet valve 24. At the bottom dead center of the piston 12 the direction of movement of the piston 12 changes, causing the inlet valve 24 to close. The piston 12 now moves in the direction of the outlet valve 36. In the process pressure builds up in the delivery chamber 32, until the pressure therein is greater than the return force of the valve spring 62 of the outlet valve 36.

On the side of the outlet valve 36 remote from the delivery chamber 32 the outlet-restricting element 42 in the form of a restrictor plate is arranged on its mount 40 in the component 38. Here, on the inside of the angled edge of the mount 40, the component 38 comprises a step 64, on which the restrictor plate bears with its outer edge area and is thereby pre-tensioned in an axial direction. Such pre-tensioning leads to a defined opening pressure for the restrictor plate in front of the openings 52.

For this purpose the component 38 is secured in the pump housing 11 with the outlet-restricting element 42 between the cylinder element 22 and the closure element 46.

With the outlet valve 36 opened, the fluid flows through the component 38 according to the disclosure, through its central opening 54, then past the outlet-restricting element 42 back through the openings 52, and then onwards into the outlet opening 37 acting as delivery line. In conducting the fluid past the outlet-restricting element 42, the latter is deflected from its substantially radially oriented position or extent in an axial direction and thereby imposes a restricting and/or damping effect on the fluid.

All features represented in the description, the following claims and the drawings may be essential for the disclosure, both individually and in any combination with one another.

The invention claimed is:

1. A piston pump, comprising:
   a cylinder element forming a delivery chamber with an outlet on an inside of the cylinder element; and
   an outlet valve outside the cylinder element and hydraulically downstream of the delivery chamber, the outlet valve including:
      a component defining a plurality of openings and having a first mount region; and
      an outlet-restricting element positioned over the plurality of openings and mounted at the first mount region of the component in such a way that fluid passing through the plurality of openings bends the outlet-restricting element such that a radially outer portion of the outlet-restricting element deflects away from the plurality of openings in an axial direction by a greater axial distance than a radially inner portion of the outlet-restricting element,
   wherein the radially inner portion of the outlet-restricting element is fixed axially such that the radially inner portion does not move when the radially outer portion deflects.

2. The piston pump as claimed in claim 1, wherein the component bears against the cylinder element.

3. The piston pump as claimed in claim 1, wherein the component is at least partially of plate-shaped design.

4. The piston pump as claimed in claim 1, wherein:
   the outlet valve further comprises a valve spring, and
   the component comprises a second mount region on which the valve spring is mounted.

5. The piston pump as claimed in claim 4, wherein the valve spring is embodied as a leaf spring or spiral spring.

6. The piston pump as claimed in claim 1, wherein the openings of the plurality of openings are spaced around a circumference of the component.

7. The piston pump as claimed in claim 6, wherein the openings are spaced around a circumference of the first mount region.

8. The piston pump as claimed in claim 1, wherein the component is fixed in position by a closure element, which defines a space for a damper.

9. The piston pump as claimed in claim 1, wherein the component is formed as an injection-molded part, a turned metal part, or as a cold-formed part.

10. The piston pump as claimed in claim 1, wherein the piston pump is for a hydraulic assembly of an electronically controlled vehicle brake system.

11. The piston pump as claimed in claim 1, wherein the first mount region is on a first side of the component which faces toward the cylinder element, and the outlet-restricting element is interposed between the first side of the component and the cylinder element.

12. A piston pump, comprising:
    a cylinder element forming a delivery chamber with an outlet on an inside of the cylinder element; and
    an outlet valve outside the cylinder element and hydraulically downstream of the delivery chamber, the outlet valve including:
       a component defining a plurality of openings and having a first mount region; and
       an outlet-restricting element positioned over the plurality of openings and mounted at the first mount region of the component in such a way that fluid passing through the plurality of openings deflects a radially outer portion of the outlet-restricting element away from the plurality of openings in an axial direction,
    wherein the first mount region of the component comprises a step configured to pre-tension the outlet-restricting element.

13. A piston pump, comprising:
    a cylinder element forming a delivery chamber with an outlet on an inside of the cylinder element; and
    an outlet valve outside the cylinder element; and hydraulically downstream of the delivery chamber, the outlet valve including:
       a component defining a plurality of openings and having a first mount region on a first side of the component which faces the cylinder element; and
       an outlet-restricting element interposed between the first side of the component and the cylinder element, positioned over the plurality of openings, and mounted at the first mount region of the component in such a way that fluid passing through the plurality of openings deflects a radially outer portion of the outlet-restricting element away from the plurality of openings in an axial direction,
    wherein a portion of the first side of the component bears against the cylinder element.

14. The piston pump as claimed in claim 13, wherein:
    the outlet valve further comprises a valve spring, and
    the component comprises a second mount region on the first side of the component, and the valve spring is mounted on the second mount region.

15. The piston pump as claimed in claim 13, wherein the component is fixed in position by a closure element, which defines a space for a damper, the closure element bearing against a second side of the component that is opposite the first side.

* * * * *